(12) United States Patent
Sun et al.

(10) Patent No.: US 12,009,011 B2
(45) Date of Patent: Jun. 11, 2024

(54) METHOD AND DEVICE OF PRESENTING AUDIO/VIDEO FILES, COMPUTING DEVICE, AND READABLE STORAGE MEDIUM

(71) Applicant: Shanghai Bilibili Technology Co., LTD., Shanghai (CN)

(72) Inventors: Huyang Sun, Shanghai (CN); Zhaoxin Tan, Shanghai (CN); Weijia Li, Shanghai (CN); Jiangiang Ding, Shanghai (CN); Yifei Pei, Shanghai (CN); Yuxuan Gao, Shanghai (CN); Kan Hu, Shanghai (CN); Xiaofeng Ji, Shanghai (CN); Chaoran Li, Shanghai (CN); Fuling Chen, Shanghai (CN); Dejun Shan, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 307 days.

(21) Appl. No.: 16/904,124

(22) Filed: Jun. 17, 2020

(65) Prior Publication Data

US 2020/0402537 A1    Dec. 24, 2020

(30) Foreign Application Priority Data

Jun. 18, 2019 (CN) .......................... 201910528683.0

(51) Int. Cl.
*G11B 27/031* (2006.01)
*G11B 27/34* (2006.01)
(Continued)

(52) U.S. Cl.
CPC ............ *G11B 27/031* (2013.01); *G11B 27/34* (2013.01); *H04N 21/47217* (2013.01); *H04N 21/8456* (2013.01); *G06F 3/0484* (2013.01)

(58) Field of Classification Search
CPC ..... G11B 27/031; G11B 27/34; G11B 27/102; H04N 21/47217; H04N 21/8456;
(Continued)

(56) References Cited

U.S. PATENT DOCUMENTS 6,260,194 B1    7/2001 Shiels et al.
8,120,610 B1 *  2/2012 Stratton .............. G06F 16/9024
                                                    345/440.1
(Continued)

FOREIGN PATENT DOCUMENTS

CN         1166139 A     11/1997
CN       105472456 A      4/2016
(Continued)

*Primary Examiner* — Jennifer N Welch
*Assistant Examiner* — Parmanand D Patel
(74) *Attorney, Agent, or Firm* — BakerHostetler

(57) ABSTRACT

The present disclosure describes techniques of presenting audio/video (AV) files. The disclosed techniques include displaying a first interface, wherein the first interface comprises a list of a plurality of AV files and an editing area; generating a plot graph based at least in part on an input by a first user via the first interface, wherein the plot graph has a directed structure, and the at least one first type of AV file and the at least one second type of AV file are associated with different nodes of the plot graph; playing a first type of AV file; detecting that a preset instruction is received in response to determining that a playing progress of the first type of AV file reaches a first predetermined position; and playing another first type of AV file or a second type of AV file based on the preset instruction.

15 Claims, 14 Drawing Sheets

(51) Int. Cl.
*H04N 21/472* (2011.01)
*H04N 21/845* (2011.01)
*G06F 3/0484* (2022.01)

(58) Field of Classification Search
CPC ........... H04N 21/8541; H04N 21/8545; H04N 21/4341; H04N 21/4307; H04N 21/4312; H04N 21/435; H04N 21/47205; H04N 21/8133; H04N 21/8547; G06F 3/0484
See application file for complete search history.

(56) References Cited

U.S. PATENT DOCUMENTS

| | | | | |
|---|---|---|---|---|
| 2010/0281376 | A1* | 11/2010 | Meaney | G11B 27/34 715/730 |
| 2012/0239297 | A1* | 9/2012 | Yokota | G05B 15/02 702/1 |
| 2016/0005280 | A1* | 1/2016 | Laska | G08B 13/19608 386/230 |
| 2016/0216871 | A1* | 7/2016 | Stamatiou | H04N 23/631 |
| 2017/0110151 | A1* | 4/2017 | Matias | G06V 20/48 |
| 2017/0358321 | A1* | 12/2017 | Kilar | G11B 27/028 |
| 2019/0108856 | A1* | 4/2019 | Shore | G11B 27/34 |

FOREIGN PATENT DOCUMENTS

| | | |
|---|---|---|
| CN | 106998486 A | 8/2017 |
| CN | 107948751 A | 4/2018 |
| CN | 108124187 A | 6/2018 |
| CN | 109701269 A | 5/2019 |
| CN | 109794064 A | 5/2019 |

* cited by examiner

| | Hidden Value Name | Variety | Value |
|---|---|---|---|
| ▓ | Name Changeable | Add | 12 |
| ▓ | Value B | Minus | 0 |
| ▓ | Value C | Set As | -5 |
| ▓ | Value D | Add ⌄ | 3 |
| | | Add | |
| | | Minus | |
| | | Set As | |

2. Hidden Value Variety

Fig. 13

3. Hidden Value Condition Determination

| Hidden Value Name | Determination Mark | Value |
|---|---|---|
| Name Changeable | > | 12 |
| Value B | = | 0 |
| Value C | < | -5 |
| Value D | ≥ | 3 |
| Random Value X | ≤ | 10 |
| Random Value X | ≥ | 3 |

Continue to add conditions (6/10)

| Name Changeable | > |
|---|---|
| Name Changeable | > |
| Value B | = |
| Value C | < |
| Value D | ≥ |
| Random Value X | ≤ |

Fig. 14

METHOD AND DEVICE OF PRESENTING AUDIO/VIDEO FILES, COMPUTING DEVICE, AND READABLE STORAGE MEDIUM

CROSS-REFERENCE TO RELATED APPLICATION

The present application claims priority of Chinese patent application No. 201910528683.0, filed on Jun. 18, 2019. The entire disclosure of the above-identified application is hereby incorporated by reference herein and made a part of this specification.

BACKGROUND

With the continuous development of the Internet and smart terminals, more and more users choose to use the smart terminals to play AV files. Existing AV playback methods obtain contents of AV files from network servers through a smart terminal, downloads the contents in a storage medium or a cache of the smart terminal. The AV playback methods decode and play the contents of AV files using an AV decoder of the smart terminal, or obtains, from an online server, and plays contents of AV files through a streaming media decoder of the smart terminal.

Either way, plots of AV files played using the existing AV playback methods are pre-created and fixed, so that contents of the AV files are played according to a pre-defined plot sequence. The user as the audience obtains the contents of the AV files through the smart terminal and passively receives the unchanged plot contents, which means that the user is not involved in the plot creation. For the creator of the AV files, user experiences depend on plots of the AV files and subjective feelings of each user, which is unstable and difficult to balance. Thus, to obtain better user experiences, providing a new method of presenting AV files is a technical problem that urgently needs to be solved.

BRIEF DESCRIPTION OF THE DRAWINGS

By reading a detailed description of the preferred embodiments below, the various other advantages and benefits may become clear to the ordinary skill in the art. The accompanying drawings are for illustrating the preferred embodiments only and are not to be construed as limiting the invention. In addition, throughout accompanying drawings, a same part is represented by a same reference symbol.

FIG. 13 is a second schematic diagram of the second embodiment of configuring a user-defined variable of the method of presenting AV files;

FIG. 14 is a schematic diagram of the second embodiment of determining a range of the user-defined variable of the method of presenting AV files;

DETAILED DESCRIPTION OF ILLUSTRATIVE EMBODIMENTS

Figure 1:
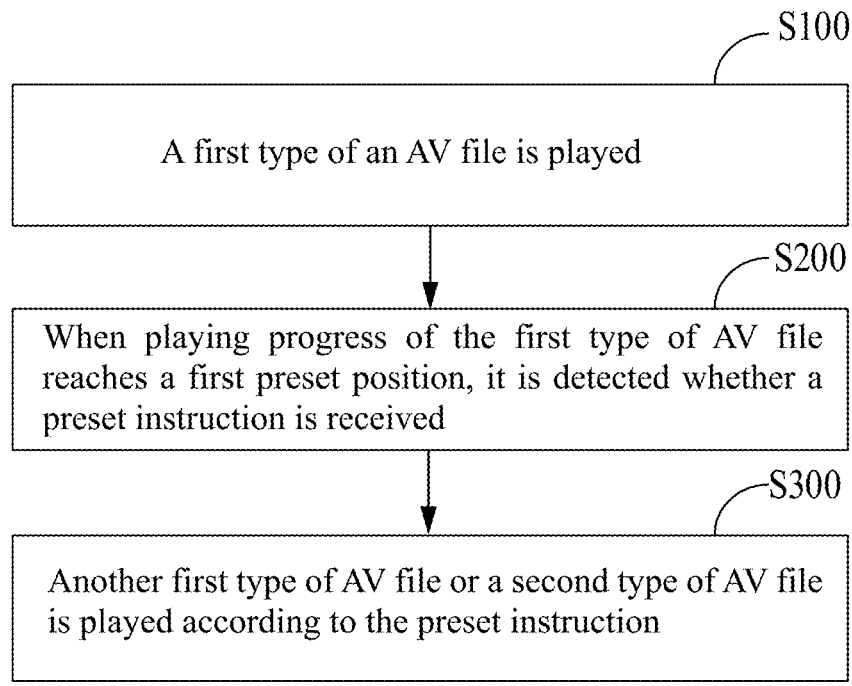
FIG. 1 is an Optional flowchart of a first embodiment of a method of presenting AV files.

To make the objectives, technical solutions, and advantages of the present application more comprehensible, the present application is described in further detail below with reference to embodiments and the accompanying drawings. It should be understood that the specific embodiments described herein are merely used for explaining the present application and are not intended to limit the present application. All other embodiments obtained by those skilled in the art based on the embodiments of the present application without creative efforts shall fall within the protection scope of the present application.

The present invention provides a method and device of presenting audio/video (AV) files, a computer device, and a readable storage medium, capable of playing different types of AV files corresponding to different plots according to preset instructions, thereby improving user experiences.

One aspect of the present invention provides a method of presenting audio/video (AV) files, wherein the AV files comprise at least one first type of AV file and at least one second type of AV file, the first type of AV file and the second type of AV file respectively correspond to different vertexes of a plot graph, the method comprising: playing a first type of AV file; detecting whether a preset instruction is received when a playing progress of the first type of AV file reaches a first preset position; and playing another first type of AV file or a second type of AV file according to the preset instruction when the preset instruction is received.

Optional, the first type of AV file is a process video file, the second type of AV file is an ending video file, the plot graph is a directed cyclic graph, the first type of AV file corresponds to a starting point of the directed cyclic graph, the second type of AV file corresponds to an ending point of the directed cyclic graph, and the detecting whether the preset instruction is received when the playing progress of the first type of AV file reaches the first preset position further comprises: suspending playing the first type of AV file when the playing progress of the first type of AV file reaches the first preset position; displaying an input option; and detecting whether the preset instruction is received within a preset time.

Optional, the preset instruction is a user trigger instruction, the method of presenting AV files further comprises: configuring the user trigger instruction; establishing an association between the user trigger instruction and the first type of AV file and the second type of AV file; wherein the detecting whether the preset instruction is received within the preset time further comprises; detecting whether a user input is received within the preset time; and triggering the corresponding user trigger instruction when the user input is received within the preset time.

Optional, the preset instruction is a system instruction, the method of presenting AV files further comprises configuring the system instruction; and establishing an association between the system instruction and the first type of AV file and the second type of AV file. The detecting whether the preset instruction is received within the preset time further comprises detecting whether a user input is received within the preset time; and outputting the system instruction when the user input is received within the preset time.

Optional, the method of presenting AV files further comprises: configuring at least one variable; assigning a value to the variable when the user input is received within the preset time; and, when the playing progress of the first type of AV file reaches a second preset position, playing a corresponding second type of AV file or a corresponding first type of AV file according to a range of the variable value.

Optional, the variable comprises a user-defined variable, the method of presenting AV files further comprises: establishing a first association between the user-defined variable and the first type of AV file and the second type of AV file; and playing the corresponding second type of AV file or the corresponding first type of AV file according to a range of the user-defined variable value. The step of assigning the value to the variable further comprises: determining the corresponding first type of AV file or the corresponding second type of AV file when the user input is received within the preset time; and assigning a value to the variable according to the first association.

Optional, the variable comprises a random variable, wherein the assigning the value to the variable further comprises: determining the corresponding first type of AV file or the corresponding second type of AV file when the user input is received within the preset time; and randomly assigning a value to the user-defined variable. The step of playing the corresponding second type of AV file or the corresponding first type of AV file according to a range of the variable value further comprises: determining a range of the random variable value; and playing the corresponding second type of AV file or the corresponding first type of AV file according to the range of the random variable value.

Optional, the AV file further comprises a third type of AV file, the method of presenting AV files further comprises: when the playing progress of the first type of AV file reaches a first preset position, loading the third type of AV file or adjusting an amount of audio output and/or pixel values of video output frames of the first type of AV file.

Optional, the method of presenting AV files further comprises configuring at least one display marker; establishing an association between the display marker and the first type of AV file; and display the display marker while the first type of AV file is played. A marker corresponding to the first type of AV file which is being played or has been played is shown as a first pattern and a marker corresponding to the first type of AV file which has not been played is shown as a second pattern.

Optional, the receiving the preset instruction within the preset time further comprises activating a timer; detecting whether a user input is received; and outputting the system instruction when an output value of the timer reaches a threshold value.

Optional, the input option comprises, but is not limited to, text, pattern control, button control, polygon input box or polygon trigger control, the step of displaying the input option further comprises: receiving a user preset input, wherein the user preset input comprising display contents and display position information of the input option; storing the user preset input in the first type of AV file corresponding to a plot node of the plot graph; and displaying the display contents of the input option in a display area corresponding to the display position information when the playing progress of the first type of AV file reaches the first preset position.

Optional, the method of presenting AV files further comprises: displaying a plot setting interface comprising an editing area of the plot graph; displaying a list of the first type of AV file and the second type of AV file and markers of the first type of AV file and the second type of AV file; receiving a second user input, wherein the second user input comprising the markers of the first type of AV file and the second type of AV file; establishing an association between the markers of the first type of AV file and the second type of AV file and vertices of the plot graph.

Optional, the playing the first type of AV file and the second type of AV file when the preset instruction is received further comprises: obtaining markers of other first type of AV file and other second type of AV file; and inquiring storage locations of the first type of AV file and the second type of AV file to obtain the other first type of AV file and the other second type of AV file.

In order to achieve the above purpose, the present invention further provides a device of presenting AV files, the AV files comprising at least one first type of AV file and at least one second type of AV file, the device comprises: a first playing module, playing a first type of the AV file; a detecting module, detecting whether a preset instruction is received when the playing progress of the first type of AV file reaches a first preset position; and a second playing module, playing the other first type of AV file or a second type of AV file according to the preset instruction when the preset instruction is received.

In order to achieve the above purpose, the present invention further provides a computer device, comprising a memory, a processor, and computer programs stored in the memory and executed by the processor, wherein the processor executes the computer programs for implementing the steps of the method of presenting AV files.

In order to achieve the above purpose, the present invention further provides a computer-readable storage medium, storing computer programs executed by at least one processor, to cause the processor to implement the steps of the method of presenting AV files.

The method and device of presenting audio/video (AV) files, the computer device, and the computer readable storage medium provided by the present invention, dividing the AV files into a first type of AV file and at least a second type of AV file, determining whether the preset instruction is received when the playing progress of the first type of AV file reaches the first preset position, and playing the other first type of AV file or the other second type of AV file according to the preset instruction. Wherein, different types of AV files correspond to different plot designs, so that different types of AV files corresponding to different plots can be played according to the preset instructions, which improves user experiences.

Embodiment One

The first embodiment of a method of presenting audio/video (AV) files of the present invention will be described below with reference to the drawings.

FIG. 1 is a flowchart of a first embodiment of a method of presenting AV files of the present disclosure, which is applied to a computer device which may comprise a server and a client.

Wherein, the client is a user's smart terminal which may be implemented in various forms. For example, the terminals described in the present invention may include mobile terminals, such as mobile phones, tablet computers, notebook computers, PDAs, personal digital assistants, portable media players, and fixed terminals, such as digital TVs and desktop computers. In the following description, a fixed terminal will be used as an example for illustration. Those skilled in the art will understand that, in addition to elements specifically used for mobile purposes, the configuration according to the embodiments of the present invention can also be applied to fixed-type terminals.

Wherein, the server may be a single server device, or a server cluster or a part of a virtual host are configured in a single server.

As shown in FIG. 1, the method specifically includes the following steps:

Step S100: a first type of the AV file is played.

Specifically, a process of playing the AV file at least comprises processing steps of receiving, parsing, decoding, and outputting AV file data.

Wherein, the receiving of the AV file data is to receive, acquire, and obtain AV file data stream sent from a data source. There can be multiple data sources, such as, a hard disk or an external storage device of an intelligent terminal, or a server connected through a network. A unified interface is provided to different data sources and AV files from different sources are obtained, through different protocols and data parsers, and transmitted to a player for processing.

Wherein, the parsing of the AV file data is also called demultiplexing, which separates the combined audio/video. The audio data and video data are encoded independently, as they are produced, to obtained separated data. The separated data may be combined into different package formats due to convenient transmission. The demultiplexing process decomposes the audio/video streams and then transmits the send audio/video streams to an audio decoder and a video decoder, respectively, for decoding operations.

Wherein, the decoding of the AV file data includes audio decoding and video decoding. Due to the convenient transmission, the AV files are compressed before decoding. The decoding operation restores the compressed AV files to the original AV files.

Wherein, the outputting of the AV file data includes audio output and video output. The decoded audio data is sent to a sound card, while the decoded video data is sent to a graphics card to control picture display, thereby completing the playing process.

In addition, the audio data and video data are provided independently after the demultiplexing operation is performed. Therefore, a synchronization mechanism is needed to synchronize the audio/video, as well as to control a speed, pause, stop, jump in and get various media information, set attributes, etc., while the AV files are played.

This synchronization mechanism is implemented through timestamps of the AV file. The synchronization mechanism makes the time stamp information to be displayed on an interface of a player interface, and enable a user to obtain and control the playing progress of the AV files.

In the embodiment, the AV files include at least one first type of AV file and at least one second type of AV file. The first type of the AV file and the second type of the AV file respectively correspond to different vertices or nodes of a plot graph, so that the first-type of AV files and the second-type of AV files respectively correspond to different plot settings.

Specifically, the plot graph includes four types of nodes, comprising a starting node, an ending node, a process node, and a branch selection node. The first type of AV file corresponds to a starting point and middle vertexes of the plot graph. The starting point corresponds to the starting node of the plot graph, the second type of AV file corresponds to the ending point of the plot graph, and the ending point corresponds to the end node of the plot graph. The plot graph further includes the process nodes, which may be associated with the branch selection nodes or a next process node containing a corresponding plot. The process nodes allow upper nodes and lower nodes in multiple plot graphs. The nodes are also used for descriptions of a title of the player and process backtracking. The branch node includes two types, a text selection form and a fixed-point selection form. The text selection form provides a fixed-position text option when the plot is manually selected, while the fixed-point selection form provides an option corresponding to a specific location of video contents when the plot is manually selected. The first type of AV file is a process video file, and the second type of AV file is an ending video file. The process video file corresponds to a developing plot, and the ending AV file corresponds to different plot endings according to the developed plot. Different plot deductions can be achieved by playing different video files.

Figure 2:
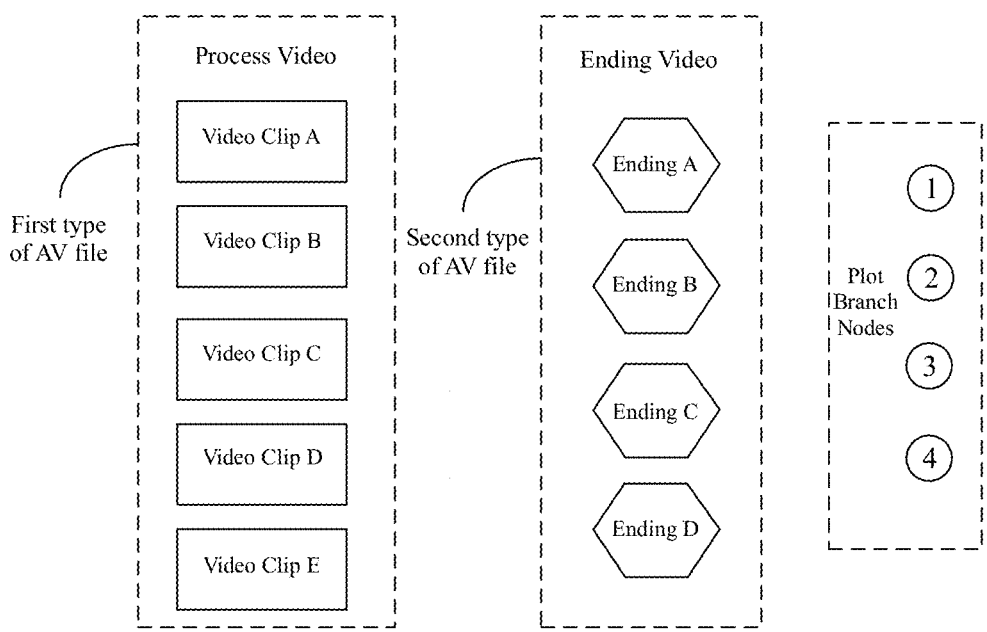
FIG. 2 is an Optional schematic diagram of the first embodiment of a first type of AV files and a second type of AV file.
Figure 3:
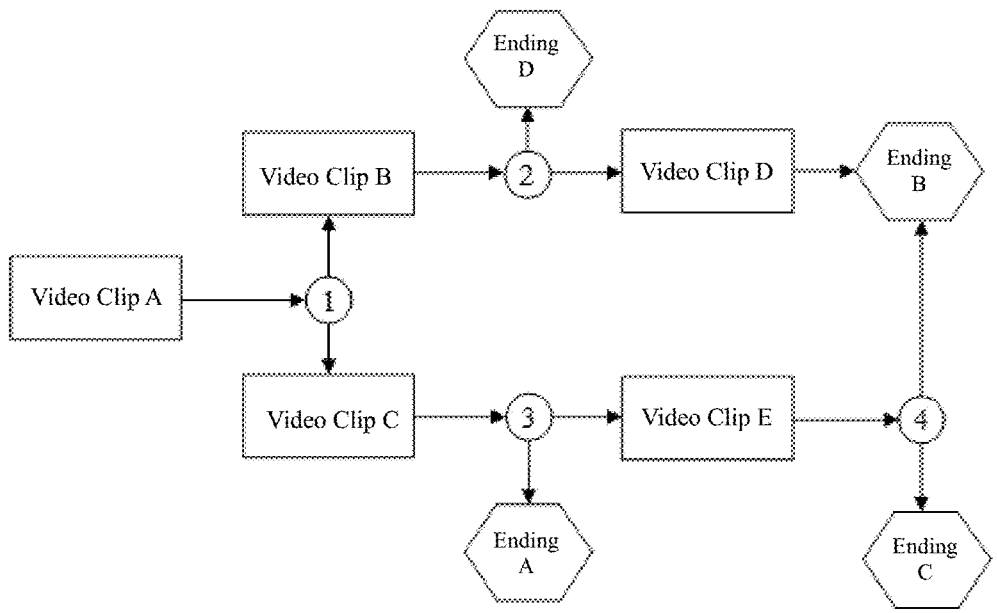
FIG. 3 is an Optional schematic diagram of the first embodiment of plot graphs used in the method of presenting AV files.

As shown in FIGS. 2 and 3, the AV files include five first type of AV files, four the second type of AV files, and four plot branch nodes. The five first type of AV files and the four second type of AV files form a plot graph through the four plot branch nodes. The plot graph is a directed cyclic graph. The vertex corresponds to the first type of AV file and the second type of AV file of the plot graph. The plot branch node is a position marker configured in the plot in the plot graph and corresponds to the first preset position.

Wherein, a video clip A, a video clip B, a video clip C, a video clip D, and a video clip E, the video clip A is a starting point of the plot graph in FIG. 3. The video clip B, video clip C, video clip D, and video clip E are middle vertices of the plot graph in FIG. 3. The starting point and middle vertices direct to other vertices or ending points as each of the outdegree and indegree of the starting point and middle vertices is equal to at least 1.

Wherein, an ending A, an ending B, an ending C, and an ending D are ending points of the plot graph in FIG. 3. The ending point is directed to the starting point or middle vertex of the directed cyclic graph. The ending point does not direct to other vertices as its indegree is equal to at least 1 and the outdegree is equal to 0, which is the end of the plot graph. When the second type of AV file has been played, that is, when any one of the ending A, ending B, ending C and ending D has been played, the plot graph is terminated, and playing the AV files is stopped.

As the AV files are being played, the first type of AV file is first played. The first type of AV file refers to a video clip A of the process video file or one of a video clip B, a video clip C, a video clip D and video clip E. A video clip which is selected to be played is pre-set according to the plot of the creator.

Step S200: when the playing progress of the first type of AV file reaches a first preset position, it is detected whether a preset instruction is received.

Specifically, the process position, the first preset position, of the plot switching is triggered by the preset AV file. When the playing progress of the first type of AV file reaches the first preset position, it starts to detect whether the preset instruction is received. In this embodiment, the audio/video synchronization mechanism is determined by an audio timestamp, and a corresponding video frame is obtained according to the audio time to play the AV file. Therefore, the playing progress of the first type of AV file reaches the first preset position is determined according to a trigger value of the preset audio timestamp, so as to detect whether the preset instruction is received by determining whether the audio timestamp information meets the preset trigger value.

Wherein, the preset instruction may be pre-stored in the smart terminal according to certain rules or maybe an instruction input by a user. In this embodiment, the preset instruction includes an instruction pre-stored and triggered by the user and an instruction stored in the smart terminal in accordance with certain rules. In the method of presenting AV files, for example, the rules are predefined. When a mouse click input of the user is obtained, a preset instruction is triggered, so that the system determines that the preset instruction is detected. When the user input is not detected but a preset event of the video playback is triggered, for example, the video playback is decoded to obtain corresponding manually selected plot instruction parameters in the process node, the system generates a preset instruction and determines that the preset instruction is detected.

In other embodiments, the user inputs may also include keyboard inputs, facial images captured by a camera, voice instructions detected by a microphone, and the like. According to preset rules, corresponding preset instructions may be triggered via acquiring different user inputs.

In this embodiment, the user is a video viewer. In another embodiment, the user may also be a video creator of a second user.

Step S300: Another first type of AV file or the second type of AV file is played according to the preset instruction.

When the system determines that the preset instruction is received, the other first type of AV file or the other second type of AV file is played. The plot can be switched by playing the other first type of AV file or the other second type of AV file. Since different types of AV files and different video clips and endings of the same types of AV files contain different plot settings. When the system determines that a preset instruction is received, it corresponds to different plot nodes. Thus, the purpose of switching multiple plots can be achieved by detecting whether the preset instruction is received and triggering playing other video clips and combination changes via the preset instruction.

In this embodiment, not only playing different AV files can be triggered by preset instructions, but also a specific AV file can be played according to a preset instruction. For example, an association of different preset instructions and different AV clips is established in advance. The development of the plot can be controlled according to the user's subjective wishes via triggering the corresponding preset instruction through the user input, thereby improve the effect of user experiences.

Through pre-associating different preset instructions with AV clips, corresponding plots may be generated to facilitate the creator's plot design and the user's plot switching. As shown in FIG. 3, as the playing progress of the video clip A, the video clip B, the video clip C, and the video clip E have reached the preset process, the user manually triggers the preset instruction four times to get four plot endings, the ending A, the ending B, the ending C, and the ending D.

In other embodiments, the preset instruction is only used to trigger the switching of playing different AV files. It is also possible to switch the plot in a random way without controlling the playing order of corresponding AV files, so that the user can obtain more user experiences in more aspects.

In this embodiment, the AV files are divided into a first type of AV file and at least a second type of AV file. When the playing progress of the first type of AV file reaches the first preset position, it is determined whether the preset instruction is received, and the other first type of AV file or the other second type of AV file are played according to the preset instruction. Wherein, different types of AV files correspond to different plot designs, so that different types of AV files corresponding to different plots can be played according to the preset instructions, which improves user experiences.

Figure 4:
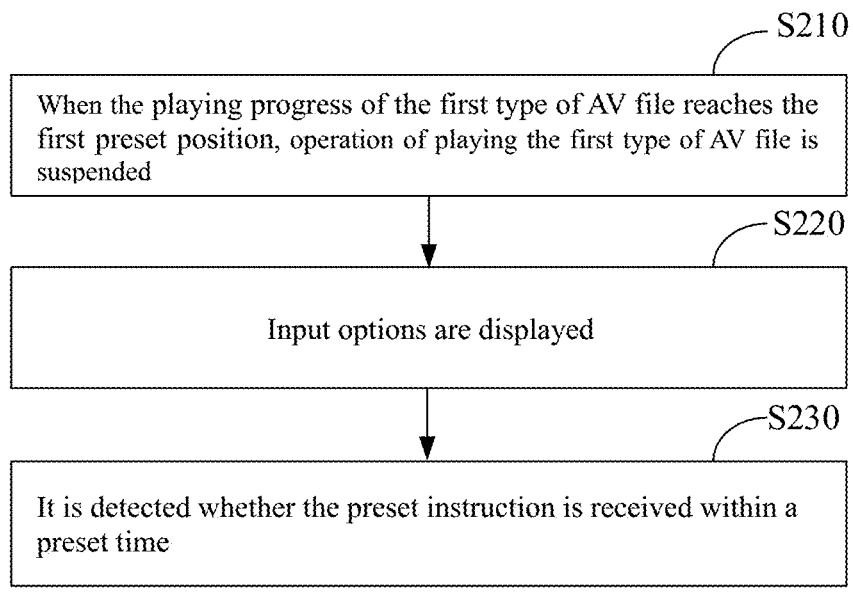
FIG. 4 is an Optional flowchart of the first embodiment of the step S200 in FIG. 1.

As shown in FIG. 4, in this embodiment, step S200: when the playing progress of the first type of AV file reaches the first preset position, it is determined whether a preset instruction is received, the step further comprises:

Step S210: when the playing progress of the first type of AV file reaches the first preset position, operation of playing the first type of AV file is suspended.

Since the first preset position is often located at a node used for plot switching, when the playing progress of the video file reaches the position, which represents the end of a plot, and the position of the next plot needs to be determined. Therefore, when the user has not selected, that is, when the playing progress of the first type of AV file reaches the first preset position, the operation of playing the video is suspended.

Step S220: an input option is displayed.

After the video playback is suspended, an input option is generated and displayed on a playback interface to provide user input and selection interfaces. The input options include, but are not limited to, text, pattern control, button control, a polygon input box, polygon trigger control, or their combinations.

Figure 5:
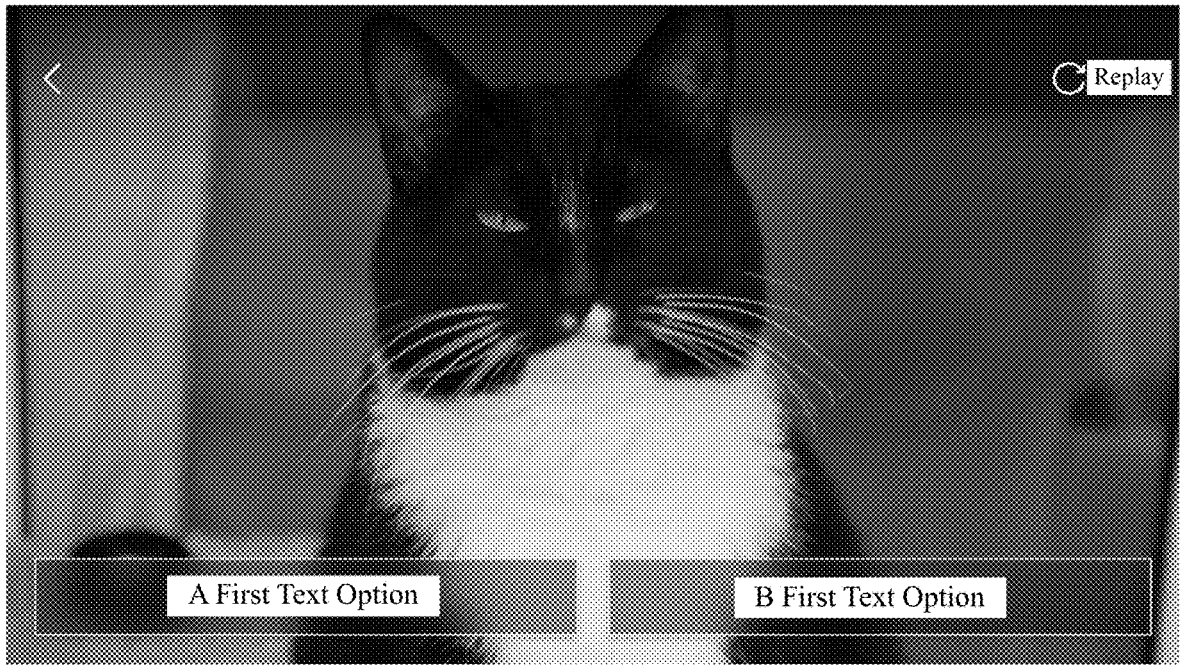
FIG. 5 is a first schematic diagram of a third embodiment of an interface of a display input of the method of presenting AV files.

As shown in FIG. 5, after the video playback is suspended, two rectangular button control input options for displaying text are generated and displayed symmetrically at a fixed position in the lower part of the playback interface to provide user input and selection. The input options are "A First Text Option" and "B Second Text Option" shown in FIG. 5.

Figure 6:
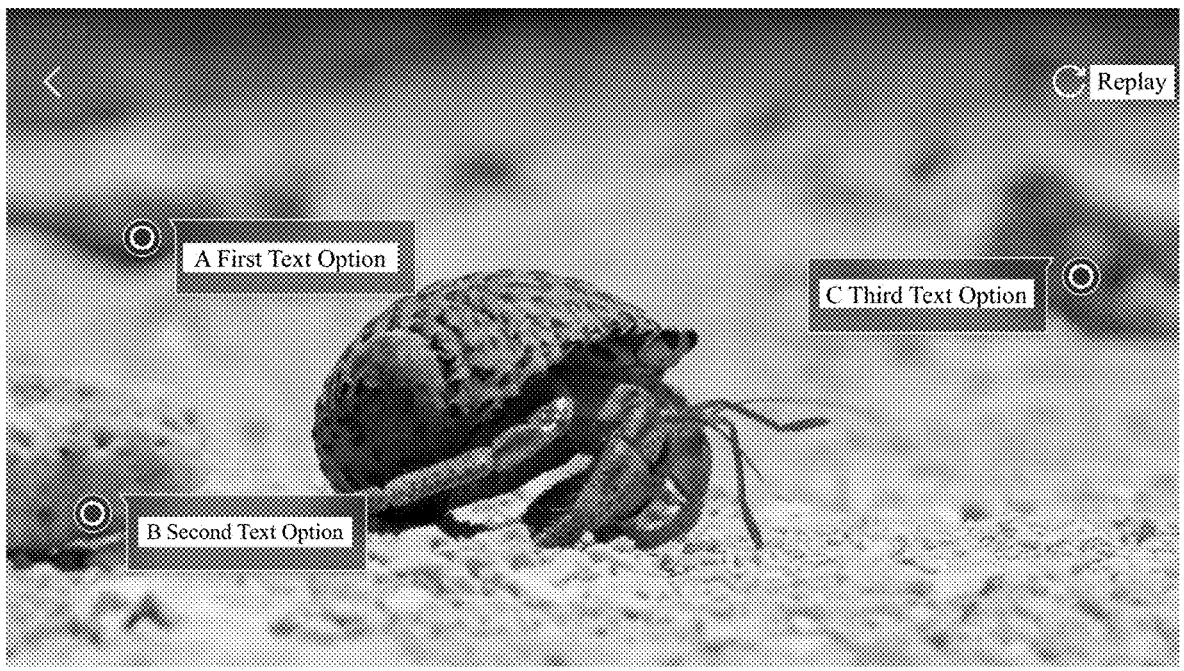
FIG. 6 is a second schematic diagram of the third embodiment of an interface of a display input of the method of presenting AV files.

As shown in FIG. 6, after the video playback is suspended, three rectangular button control input options for displaying text are generated and displayed at corresponding positions in the playback interface according to the position of the object of the current video playback content to provide user input and selection. The input options are "A First Text Option", "B Second Text Option" and "C Third Text Option" shown in FIG. 6 corresponding to the corresponding positions of the stones in the object of the current video playback content.

Figure 7:
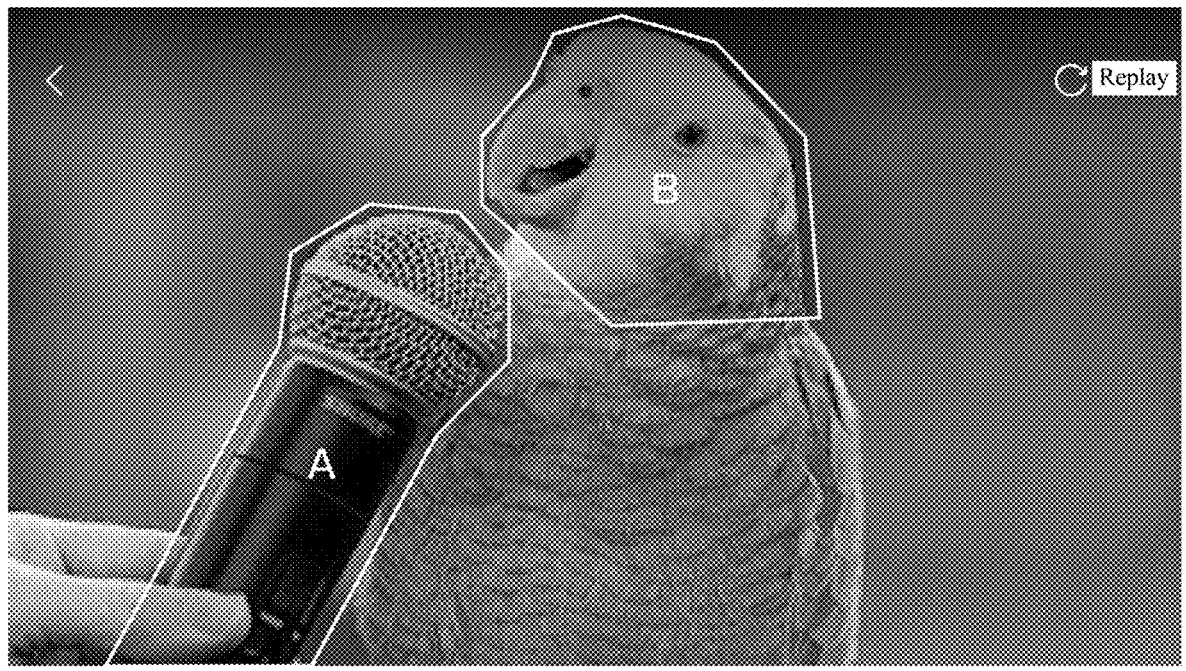
FIG. 7 is a third schematic diagram of the third embodiment of an interface of a display input option of the method of presenting AV files.

As shown in FIG. 7, after the video playback is suspended, two polygon trigger control input options are generated and displayed at corresponding positions of the playback interface according to the position of an object of the current video playback content to provide user input and selection. The input options are rendered as the polygon A and the polygon B shown in FIG. 7, which correspond to the corresponding positions of the topic and parrot in the object of the current video playback content, so as to provide the user with an interface for selecting a microphone and a parrot.

Wherein, the input option serves as explanation information of prompting or instructing the user to make a selection. The option text is displayed in the input option. Multiple trigger controls can be generated through the way of asking questions. Each of the trigger controls displays a corresponding text explanation content which indicates the development direction of the plot.

For example, when the playing progress of the first type of AV file reaches the first preset position, at this time the playback picture shows a Role A holding a pistol, and four trigger controls are output and display corresponding text explanation information:

Trigger control 1 displays: "Put the gun down";
Trigger control 2 displays: "Fire";
Trigger control 3 displays: "Give the gun to Role B"; and
Trigger control 4 displays: "Yell with raising a gun";
Trigger controls 1-4 respectively correspond to and associate with different preset instructions. When the user clicks the corresponding trigger control using the mouse, the corresponding trigger control triggers the associated preset instruction. According to the corresponding preset instruction detected by the system, the associated video clip or ending is determined to be played after the plot is changed, so that the plot branch of the plot graph shown in FIG. 3 is selected according to the user's selection.

Figure 8:
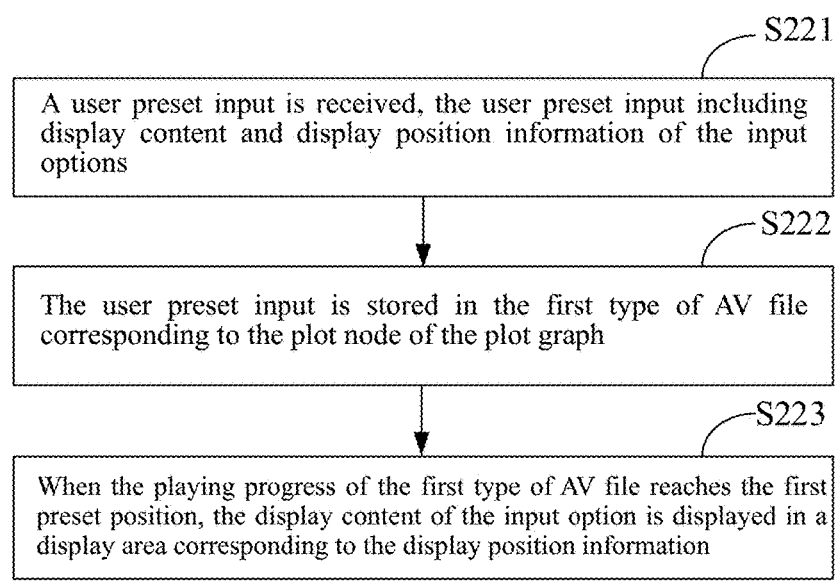
FIG. 8 is an Optional flowchart of the first embodiment of the step S220 in FIG. 4.

Specifically, as shown in FIG. 8, in this embodiment, the step S220: the input option is displayed, the specific implementation process includes the following:

Step S221: a user preset input is received, the user preset input including display content and display position information of the input options.

Step S222: the user preset input is stored in the first type of AV file corresponding to the plot node of the plot graph.

Step S223: when the playing progress of the first type of AV file reaches the first preset position, the display content of the input option is displayed in a display area corresponding to the display position information.

In this embodiment, the content of the input option displayed in the display area is edited and predefined by the user while the video is created. In the light of storing the display coordinate points of the input option, the display size of the display content and the text information into the first type of AV file corresponding to a specific plot node of the plot graph, when the playing progress of the first type of AV file by the player reaches the first preset position, the corresponding position of the input option that needs to be displayed is rendered. The display position may be a fixed position or a fixed-point position of the object in the video, which corresponds to the text selection form and the fixed-point position selection form in the branch selection node, as shown in FIGS. 5 and 6.

For example, when the picture of the first type of video file which is being played shows a role raising a pistol, according to the preset rules, when the plot node corresponding to "the role raising a pistol" is being played, which means the playing progress reaches the first preset position, the polygon input option is rendered in the display position showing the pistol in the plot according to the position information corresponding to the input option, for example, the display coordinate points, and the content of the input option, for example, a polygon input option trigger control, to provide the user to choose whether to trigger the fire action or not. The coordinate points pre-input as the user is editing correspond to the display area where the pistol appears. If the user clicks the input option, the plot subsequent to the picture of fire-action is selected. If the user does not click the input option, another input option representing the plot subsequent to the picture without the fire action is selected.

In other embodiments, the display input options can also be obtained in real-time by parsing the picture contents, which may be obtained, for example, through preset rules, or through specific features in the picture obtained via big data or an artificial intelligence network model. The corresponding input options are displayed in corresponding display areas via the rules established through these features.

For example, when the picture of the first type of video file currently being played is parsed to obtain picture information showing a role raising a pistol, in view of a preset rule: "if a pistol appears in the picture, an input option of whether to fire or not to fire is generated", a polygon input option is generated and displayed in the display area where the pistol appears to provide the user with a choice whether to trigger the fire action. If the user clicks the input option, the plot subsequent to the picture of the fire action is selected. If the user does not click the input option, another input option representing the plot subsequent to the picture without the fire action is selected.

In this embodiment, the AV file further includes a third type of AV file. When the playing progress of the first type of AV file reaches the first preset position, the third type of AV file is loaded to enhance the transition effect.

In another embodiment, the transition effect can also be enhanced by adjusting the size of an audio output value and/or a pixel value of the video output frame of the first type of AV file.

Figure 9:
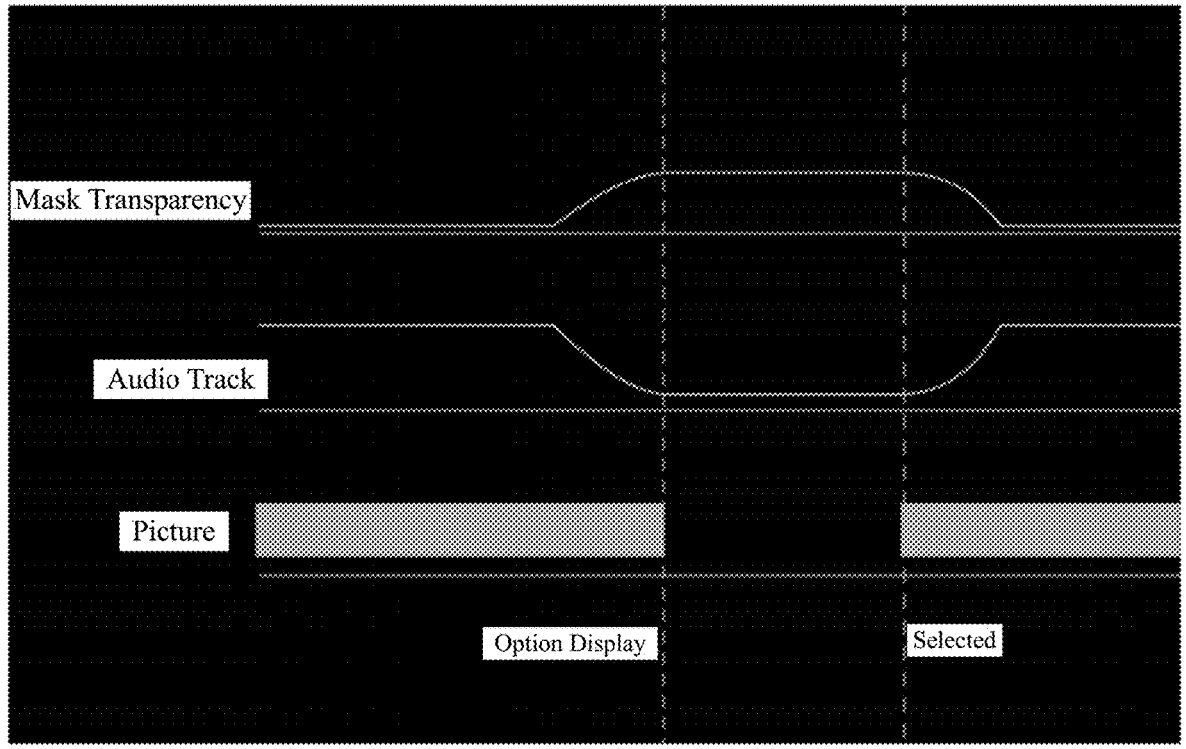
FIG. 9 is a schematic diagram of the third embodiment of a transition frame of input options comprising pause, play and display input options of the method of presenting AV files.

A direct suspending operation will interrupt the ongoing plot to affect the user's experience. As the playing progress of the first type of AV file reaches the first preset position, a transition animation can be loaded or the size of the audio output value and/or the pixel value of the video output frame of the first type of AV file can be adjusted to provide transition-enhancement experiences, such as fade-in and fade-out effects of audio tracks, adjustment of black mask transparency and special effects that other players, etc., as shown in FIG. 9.

Step S230: it is detected whether the preset instruction is received within a preset time.

Specifically, in this embodiment, the preset instruction is a user trigger instruction and a system instruction. When the preset instruction is the user trigger instruction, the embodiment of the method further includes configuring the user trigger instruction and establishing an association between the user trigger instruction with the first type of AV file and the second type of AV file.

Wherein, the operation of detecting whether the preset instruction is received within the preset time specifically includes detecting whether a user input is received within the preset time and triggering a corresponding user trigger instruction when the user input is received within the preset time instruction.

When the preset instruction is a system instruction, this embodiment of the method further includes configuring the system instruction and establishing an association between the system instruction and the first type of AV file and the second type of AV file.

Wherein, the operation of detecting whether the preset instruction is received within the preset time specifically includes detecting whether user input is received within the preset time and outputting the system instruction when the user input is not received within the preset time.

In another embodiment of the present invention, the preset instruction is only a user-triggered instruction, and the plot is completely developed by the user's choice.

When the playback has been suspended and the input options have been displayed, it is detected whether the preset instruction is received within the preset time. If the preset instruction is received within the preset time, corresponding video chips and a corresponding ending is selected according to the received preset instruction. If the preset instruction is not received within the preset time, a default plot or a random plot can be selected or the operation of playing the AV files can be suspended.

Figure 10:
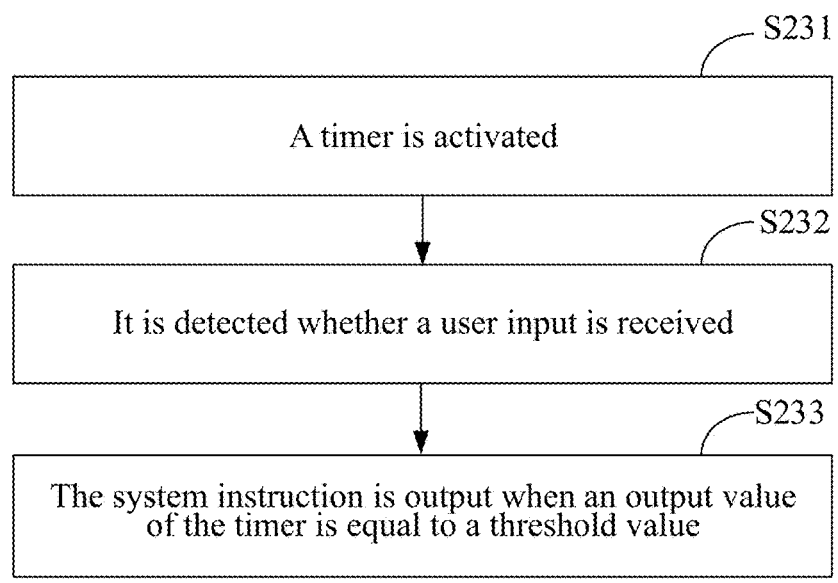
FIG. 10 is an Optional flowchart of the step S230 in FIG. 4.

Wherein, as shown in FIG. 10, in this embodiment, step S230: it is detected whether the preset instruction is received within the preset time, specifically including:

S231: a timer is activated.

S232: it is detected whether a user input is received.

S233: the system instruction is output when an output value of the timer is equal to a threshold value.

In this embodiment, a timer is activated and displayed to detect whether the preset instruction is received within the preset time. For example, when the picture of the first type of video file currently being played is obtained and parsed to obtain picture information including a role raising the pistol, in view of the preset rule: "if a pistol appears in the picture", an input option of whether to fire or not to fire is generated", a polygon input option is generated in the display area where the pistol appears to provide the user with the option whether to trigger the fire action or not, and a timer with 3 seconds countdown. If the user clicks the input option within 3 seconds, the system receives the user trigger instruction triggered by a user selection, to trigger to select the plot after the fire action is enabled. If the user does not click the input option within 3 seconds, that is, the timer counts down from 3 seconds to 0 second, the system generates a system instruction which triggers to select a default input option after the fire action is not enabled.

In this embodiment, when the playing progress of the first type of AV file reaches the first preset position, the playback of the first type of AV file is suspended, the input options are displayed, and it is detected whether the present instruction is received within the preset time. Finally, the other first type of AV file or the other second type of AV file is played according to the preset instruction. Different types of AV files correspond to different plot designs, so that the AV files corresponding to the plots manually selected by the user can be played according to the preset instructions, which improves the user experiences.

Embodiment Two

A second embodiment of the method of presenting AV files of the present invention will be described below with reference to the drawings. The second embodiment is provided on the basis of the second embodiment in which a variable of user favorability is involved, so as to automatically determine plots and combine user-selected plots through the favorability to implement the plot switching. In other embodiments, automatically determining and selecting plots can be implemented via only the favorability to implement the plot switching and the ending determination.

Figures 11, 12:
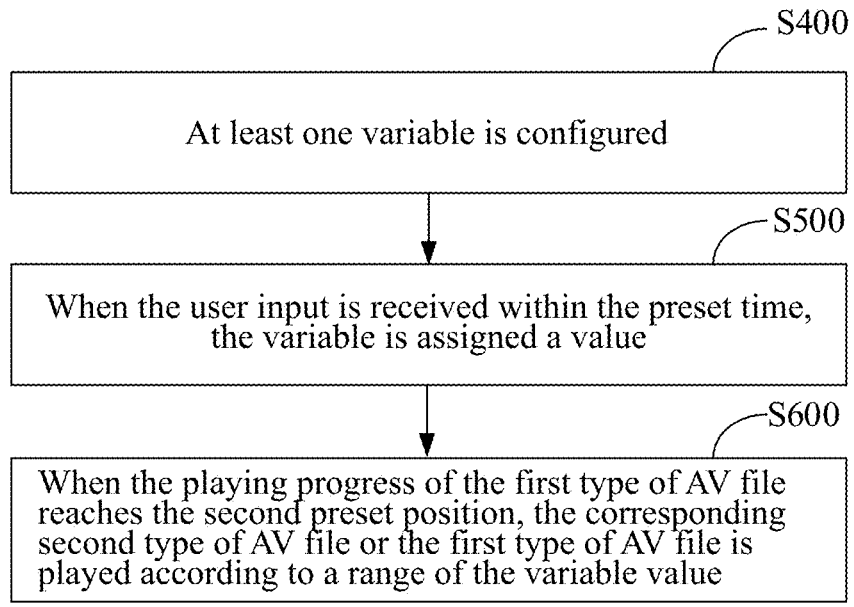
FIG. 11 is an Optional flowchart of a second embodiment of a method of presenting AV files.
FIG. 12 is a first schematic diagram of a second embodiment of configuring a user-defined variable of the method of presenting AV files.

As shown in FIG. 11, the method of presenting AV files of the second embodiment includes:

Step S400: at least one variable is configured.

Step S500: when the user input is received within the preset time, the variable is assigned a value.

Step S600: when the playing progress of the first type of AV file reaches the second preset position, the corresponding second type of AV file or the first type of AV file is played according to a range of the variable value.

Wherein, the variable is a user-defined variable. In this embodiment, the method further includes establishing a first association between the user-defined variable and the first type of AV file and the second type of AV file, and establishing a second association between the user-defined variable and the first type of AV file and the second type of AV file. The operation of assigning a value to the user-defined variable when the user input is received within the preset time specifically includes, when the user input is received within the preset time, determining the corresponding first type of AV file or the second type of AV file according to the user trigger instruction and assigning a value to the user-defined variable according to the first association. The operation of playing the corresponding second type of AV file or the first type of AV file according to the range of the user-defined variable value specifically includes determining the range of the user-defined variable value and playing the corresponding second type of AV file or the first type of AV file according to the range of the user-defined variable value and the second association.

Specifically, the value of the user-defined variable corresponds to the user's favorability. When the user-defined variable is configured, it is required to define plots and endings corresponding to different favorability and favorability values corresponding to different plots and endings. Therefore, when corresponding video clips are played, corresponding favorability values are generated, recorded, and assigned to corresponding user-defined variables.

As shown in FIG. 12, for example, a variable "a" is assigned to the role A in the plot, that is, a hidden value is created, and an initial value of the variable "a" of the hidden value is set as 12. The initial value of the variable "a" of the hidden value can also be modified or set to 0 in default. When the plot development is conducive to the role A, this part of the plot corresponds to the video clip B; when the plot development is conducive to the role A, this part of the plot corresponds to the video clip C; when the user chooses to play the video clip B, the user preset variable value is added by a preset value, such as 12; and when the user chooses to play the video clip C, the user preset variable value is increased by a preset value, such as 5, as shown in FIG. 13. The value variable "a" corresponding to the video clip C and the value variable "a" corresponding to the video clip B are different and represent the first association. Different video clips A, B, C, and D have their corresponding variable values.

Figure 15:
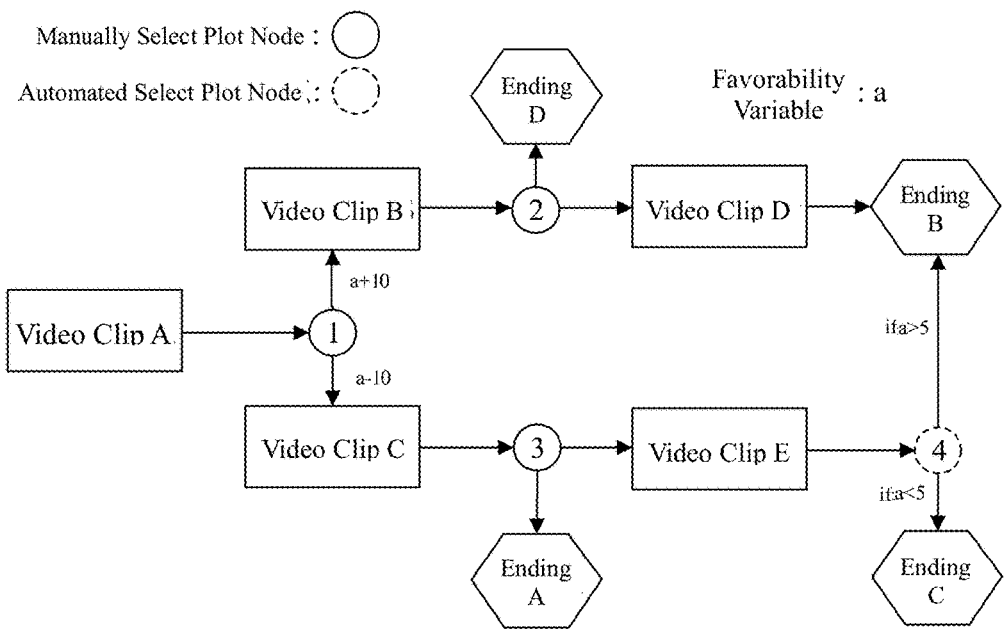
FIG. 15 is an Optional first schematic diagram of the second embodiment of plot graphs used in the method of presenting AV files.

As shown in FIG. 14 and FIG. 15, as the plot is developed based on the preset combination of user selections and the hidden favorability determination, when a series of corresponding video clips A, B, C, and D are selected according to the preset instruction obtained through user input, favorability values corresponding to different video clips are obtained and added up to generated a final favorability value "a". The ending or other plots are selected according to the final favorability value "a". The corresponding association between the final favorability value "a" and the second type of AV file or the first type of AV file containing other plots means the second association.

For example, when the playing progress of the video clip D of the first type of AV file reaches the second preset position, the selection of the plot ending is triggered at this time, the specific content of the second association refers to: if the favorability value corresponding role A is greater than 5, the ending A is chosen; if the favorability value corresponding role A is less than 5, the ending B is chosen; if the user selects the plot corresponding to the video clip B at the first preset position, the final value of the variable "a" is 10 greater than 5 and the ending is selected at the second preset position, the ending A is automatically selected at this time; if the user selects the plot corresponding to the video clip C at the first preset position, the final value of the variable "a" is −10 less than 5, the ending B is automatically selected at this time, as shown in FIG. 14.

As shown in FIG. 15, in this embodiment, only one variable "a" is configured. In other embodiments of the present invention, multiple variables may also be configured to correspond to different favorability values in the plot.

Figure 16:
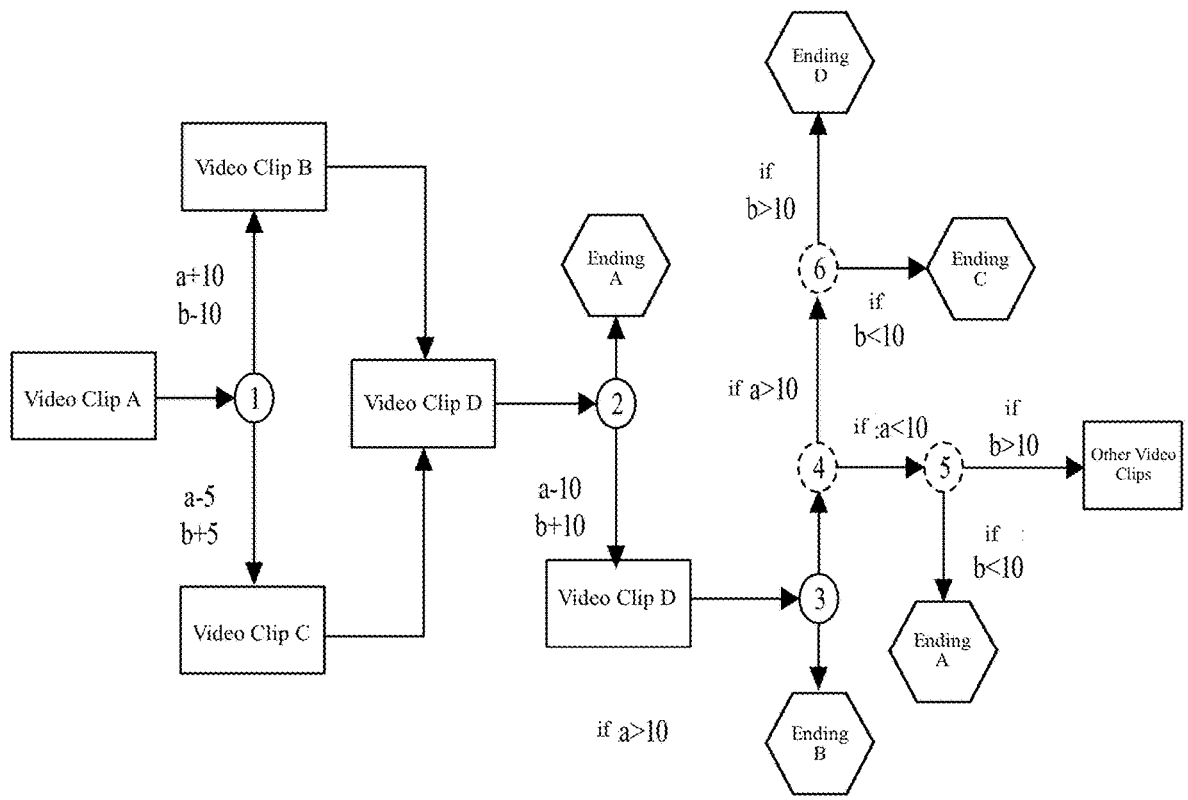
FIG. 16 is an Optional second schematic diagram of the second embodiment of plot graphs used in the method of presenting AV files.

As shown in FIG. 16, in another embodiment of the present invention, two favorability variables "a" and "b" are configured. When the ending is selected at the second preset position, corresponding endings or main stories of other plots are selected via determining favorability values corresponding to different variables based on the time point before or after the plot.

Wherein, "a" is a user-defined variable and "b" is a random variable. The difference between the random variable and the user-defined variable is that the method of assigning a value to the random variable, when the user input is received within the preset time, confirms the corresponding first type of AV file or the second type of AV file and then assigns a random value to the user-defined variable rather than assigning a preset fixed value. The advantage of adding the random variable increases unpredictability of the plot, thereby enhancing the user experiences.

Of course, in other Optional embodiments, multiple variables can also be set as user-defined variables or random variables at the same time. Alternatively, different weight values may be assigned to different favorability variables. Finally, a comprehensive favorability index is obtained and used to choose corresponding endings or other main stories of the plot.

Figure 17:
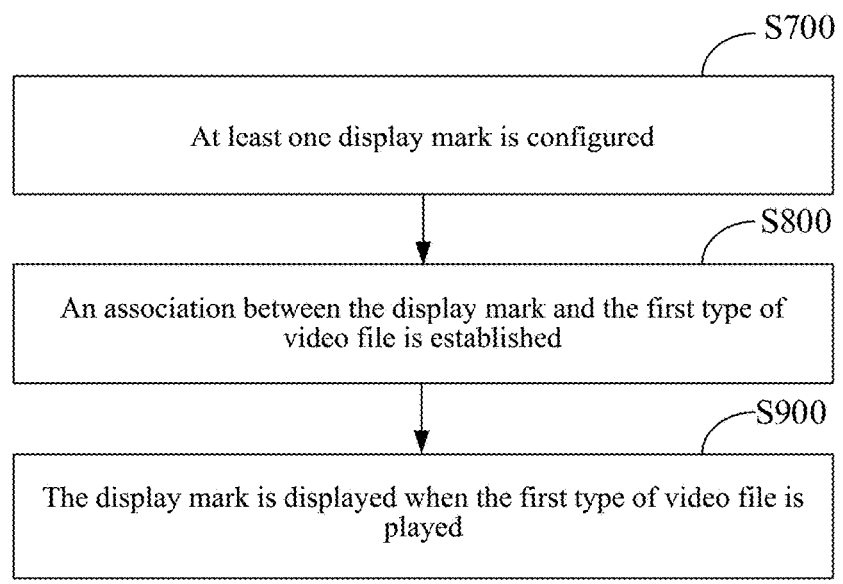
FIG. 17 is an Optional flowchart of the second embodiment of process selection of the method of presenting AV files.

As shown in FIG. 17, the second embodiment further includes:

Step S700: at least one display mark is configured.

Step S800: an association between the display mark and the first type of video file is established.

Step S900: the display mark is displayed when the first type of video file is played.

Wherein, a mark corresponding to the first type of video file which is being played or has been played is displayed as a first pattern while a mark corresponding to the first type of video file which is not played is displayed as a second pattern.

Figure 18:
FIG. 18 is an Optional first schematic diagram of the second embodiment of process selection used in the method of presenting AV files.
Figure 19:
FIG. 19 is an Optional second schematic diagram of the second embodiment of process selection used in the method of presenting AV files.
Figure 20:
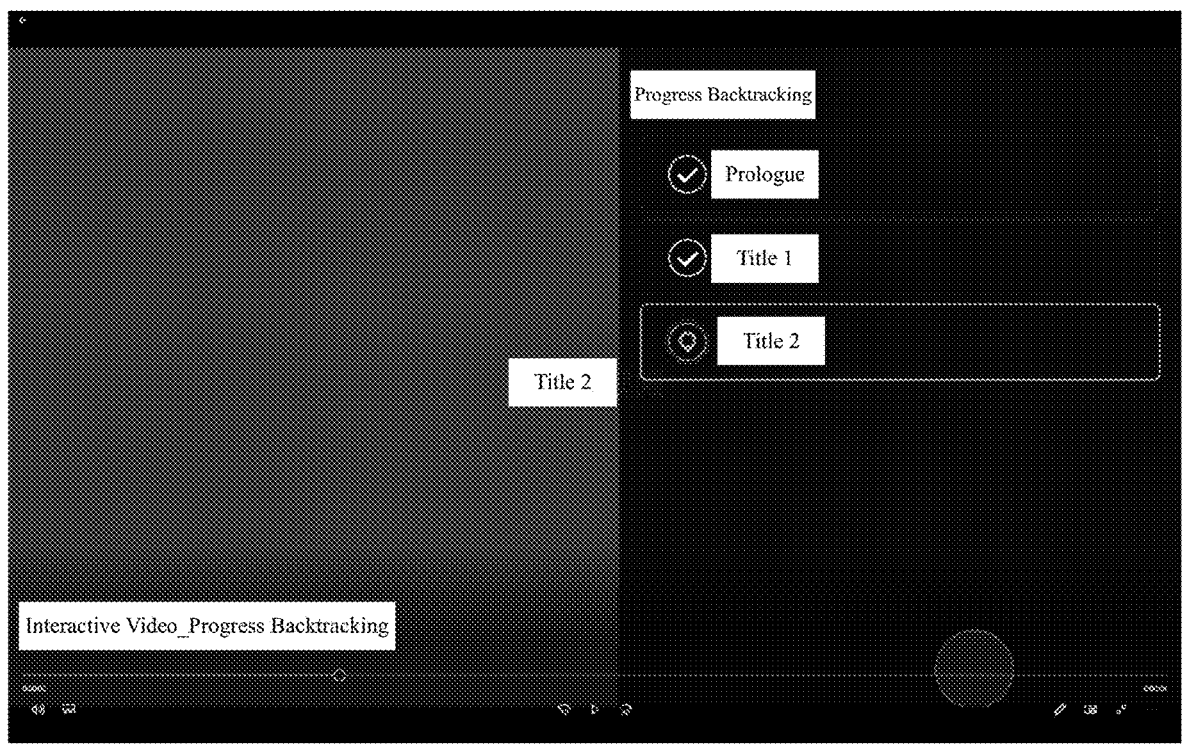
FIG. 20 is an Optional schematic diagram of process selection of the method of presenting AV files provided by the third embodiment.

In this embodiment, in view of recording selected nodes, if there are unselected plot nodes, an unlocked state is displayed. A lock state is not displayed when the ending is reached. If the user implements backtracking to the plot to re-select a different plot, the lock state of the previously selected plot node is redisplayed, which is convenient for the user to select the most satisfactory plot route, as shown in FIG. 18, FIG. 19 and FIG. 20.

In this embodiment, at least one variable is configured, when the user input is received within the preset time, the variable is assigned a value. When the playing progress of the first type of AV file reaches the second preset position, the corresponding second type of AV file or the first type of AV file is played according to the range of the variable, so that AV files corresponding to the plot can be automatically selected and played according to the user's favorability, thereby improving the user experiences.

Embodiment Three

The method of presenting AV files provided in the third embodiment of the present invention will be described below with reference to the drawings. The third embodiment is provided on the basis of the first embodiment and the second embodiment, which the operation of editing and generating a plot tree is added to the method of presenting AV files, and describes the specific implementation process of the corresponding method of presenting AV files.

Figure 21:
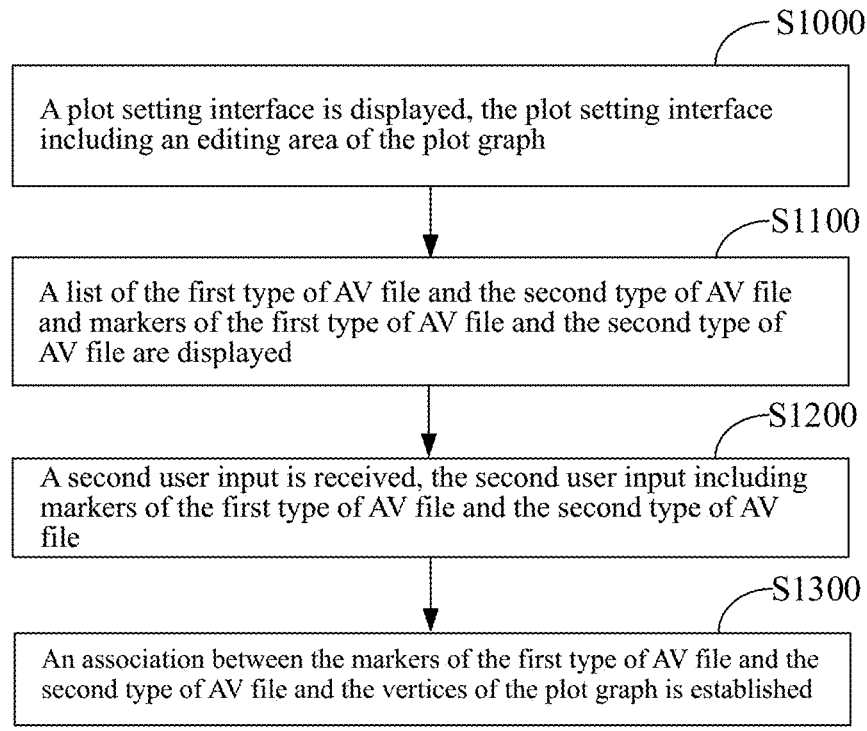
FIG. 21 is an Optional flowchart of editing plot graphs of the method of presenting AV files provided by the third embodiment.

As shown in FIG. 21, the method of presenting AV files shown in the third embodiment includes:

Step S1000: a plot setting interface is displayed, the plot setting interface includes an editing area of the plot graph.

Step S1100: a list of the first type of AV file and the second type of AV file and markers of the first type of AV file and the second type of AV file are displayed.

Figure 22:
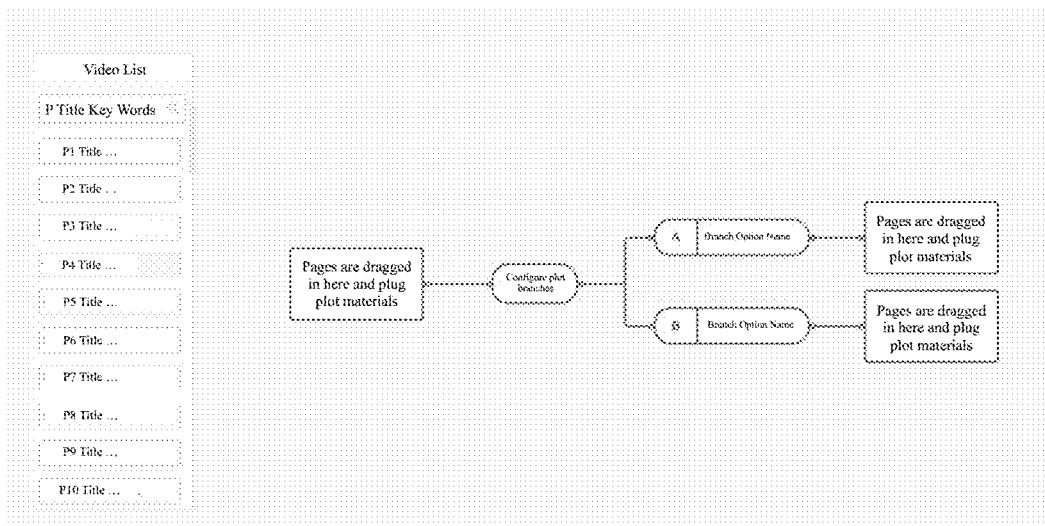
FIG. 22 is a schematic diagram of an editing interface of a plot graph of the method of presenting AV files provided by the third embodiment.

As shown in FIG. 22, the plot setting interface includes the editing area of the plot graph and the list of the first type of AV file and the second type of AV file lists, which is located at the video list portion displayed on the left side of the figure. The editing area of the plot graph displays the plot graph being edited. The style of the plot graph being edited can be modified and edited. In other words, the number of vertices included in the plot graph can be added and deleted. For example, the plot shown in FIG. 15 includes three vertices, one is directed to the two middle vertices A and B respectively. When the user clicks on the "Set Plot Branch" area of the picture, a middle vertex C in a generated input control area can be added or the middle vertex A or B can be deleted. Similarly, between any two vertices with a directional relationship, a corresponding editing area can be configured, vertices can be added or deleted, and the directional relationship can be added and deleted.

Multiple video clips P1, P2 . . . and P10 are displayed on the video list. The video clips P1, P2 . . . P10 displayed in the video list include marker information, such as the video clip titles in the figure. The video clip titles mark contents of the video clips. Each of the video clip corresponds to a unique video title. In this other embodiment, the marker information may also be other information, such as numbers or colors.

Step S1200: a second user input is received, the second user input including markers of the first type of AV file and the second type of AV file.

In this embodiment, unlike the first user who watches the video, the second user is a video creation user. The second user input is a mouse-clicking operation or a mouse dragging operation. It is to be understood that the second user input can also be, but is not limited to mouse clicking and dragging operations, any user input that can select a video clip based on the marker information.

Step S1300: an association between the markers of the first type of AV file and the second type of AV file and the vertices of the plot graph is established.

In this embodiment, the operation of establishing the association between the markers of the first type of AV file and the second type of AV file and the vertices of the plot, specifically, is to drag the multiple video clips P1, P2 . . . P10 in the video list into a corresponding editing position in the plot editing graph. The editing position corresponds to the vertex position of the plot pattern. Each of the video clips includes a piece of marker information, when a corresponding video clip is dragged to and released in the editing position of the plot editing graph, the editing position is triggered to obtain input contents to establish the marker information and the editing position of the video clip, which indicating the association of the vertices of the plot graph.

Figure 23:
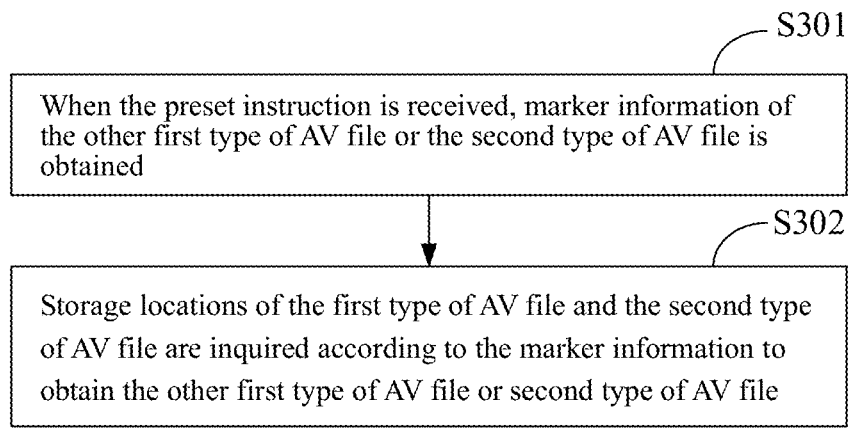
FIG. 23 is an Optional flowchart of a method of presenting playing the other first type of AV file or the other second type of AV file provided by the third embodiment.

As shown in FIG. 23, in this embodiment, correspondingly, step S300: when the preset instruction is received, the other first type of AV file or second type of AV file are played according to the preset instruction, specifically includes:

S301: when the preset instruction is received, marker information of the other first type of AV file or the second type of AV file is obtained.

S302: storage locations of the first type of AV file and the second type of AV file are inquired according to the marker information to obtain the other first type of AV file or second type of AV file.

On the basis of the first embodiment and the second embodiment, the association between the markers of the first type of AV file and the second type of AV file and the vertices of the plot graph is established, when the preset instruction, instructing switching and selecting plots is required, is received, marker information or the corresponding first type of AV file and the second type of AV file can be obtained according to the vertex information of the plot graph, and then the storage locations of the first type of AV file and the second type of AV file are inquired to obtain the other first type of AV file or the second type of AV file.

In this embodiment, according to the step of adding the operation of editing and generating a plot tree is added to the method of presenting AV files and the specific implementation process of the corresponding method of presenting AV files, the function of editing the plot can be provided to the second user, so that the AV files corresponding to the plot can be automatically selected and played according to the user's favorability, thereby further improving the user experiences.

Embodiment Four

Figure 24:
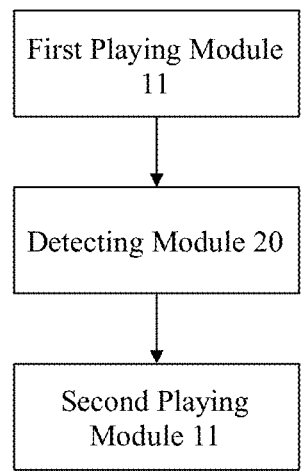
FIG. 24 is an Optional schematic diagram of a fourth embodiment of functional blocks of a device of presenting AV files.

Based on the method of presenting AV files provided in the first embodiment above, this embodiment provides a device of presenting AV files. Specifically, FIG. 24 is an Optional schematic diagram of a fourth embodiment of functional blocks of the device of presenting AV files. The Device of presenting AV files is divided into one or more program modules, and the one or more program modules are stored in a storage medium and executed by one or more processors to complete the present invention. The program modules referred to in the present invention refers to a series of computer program instruction segments capable of performing specific functions, and is more suitable for describing the execution process of the device of presenting AV files in the storage medium than the program itself. The following description will specifically introduce functions of each of the program modules of this embodiment.

As shown in FIG. 24, the device of presenting AV files specifically includes the following components:
a first playing module 11, playing a first type of AV file;
a detecting module 20, detecting whether a preset instruction is received when the playing progress of the first type of AV file reaches the first preset position; and
a second playing module 12, playing another first type of AV file or a second type of AV file according to the preset instruction.

Embodiment Five

Figure 25:
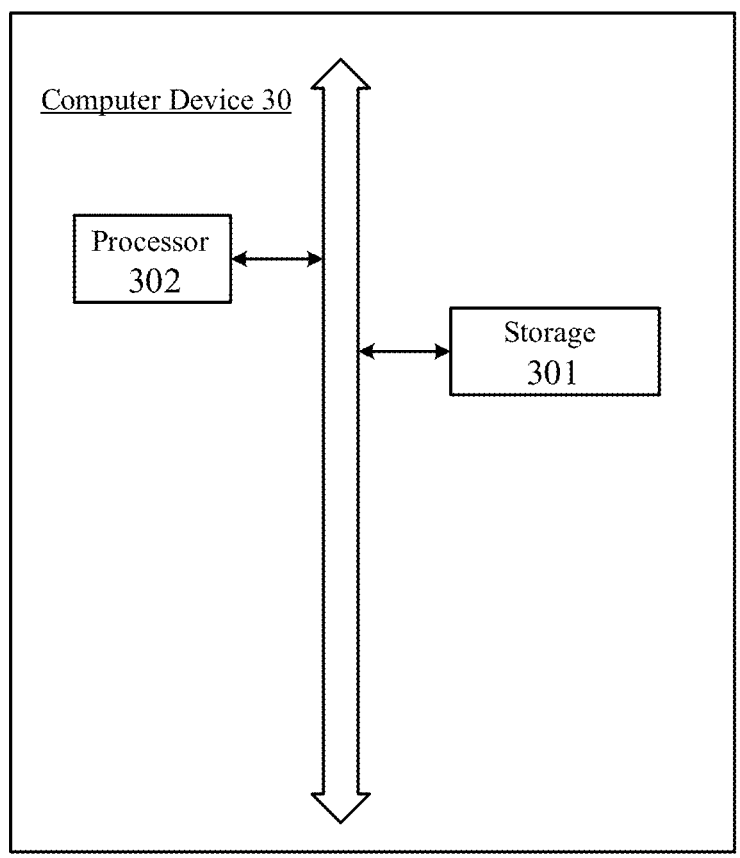
FIG. 25 is a schematic diagram of a fifth embodiment of the hardware architecture of a computer device.

This embodiment also provides a computer device, such as a smartphone, a tablet computer, a laptop computer, a desktop computer, a rack server, a blade server, a tower server, or a rack server (including an independent server, or a server cluster composed of multiple servers), etc. As shown in FIG. 12, the computing device 30 includes, but is not limited to, a memory 3010 and a processor 302 that can be communicated with each other through a system bus. It should be noted that FIG. 25 only shows the computer device 30 having components 301-302, but it should be understood that it is not required to implement all the displayed components and that more or fewer components may be implemented instead.

In this embodiment, the memory 301 (i.e., read-only storage medium) includes a flash memory, a hard disk, a multimedia card, a card-type memory (for example, SD or a DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, etc. In some embodiments, the memory 301 may be an internal storage unit of the computer device 30, such as a hard disk or memory of the computer device 30. In other embodiments, the memory 301 may also be an external storage device of the computer device 30, for example, a plug-in hard disk equipped on the computer device 30, a smart memory card (SMC), or a secure digital (SD) card, a flash card, etc. Of course, the memory 301 may also include both the internal storage unit of the computer device 30 and its external storage device. In this embodiment, the memory

301 is generally used to store an operating system and various application software installed on the computer device 30, such as program codes of the device of presenting AV files of the second embodiment. In addition, the memory 301 can also be used to temporarily store various types of data that have been output or are to be output.

The processor 302 may be a central processing unit (CPU), a controller, a microcontroller, a microprocessor, or any other data processing chip in some embodiments. The processor 302 is generally used to control the overall operation of the computer device 30.

Specifically, in this embodiment, the processor 302 is used to execute the programs of the method of presenting AV files stored in the processor 302. When the programs of the method of presenting AV files are executed, the following steps are implemented:

a first type of AV file is played;

when the playing progress of the first type of AV file reaches the first preset position, it is detected whether a preset instruction is received; and another first type of AV file or a second type of AV file is played according to the preset instruction.

The process of the specific embodiment of the processing steps described above refers to the first embodiment, which is not repeated in this embodiment.

Embodiment Six

This embodiment also provides a computer-readable storage medium, such as a flash memory, a hard disk, a multimedia card, a card-type memory (for example, SD or DX memory, etc.), a random access memory (RAM), a static random access memory (SRAM), a read-only memory (ROM), an electrically erasable programmable read-only memory (EEPROM), a programmable read-only memory (PROM), a magnetic memory, magnetic disk, an optical disk, a server, an APP store, etc., on which computer programs are stored. When the computer program is executed by the processor, the following method steps are implemented:

a first type of AV file is played;

when the playing progress of the first type of AV file reaches the first preset position, it is detected whether a preset instruction is received; and another first type of AV file or a second type of AV file is played according to the preset instruction.

The process of the specific embodiment of the processing steps described above refers to the first embodiment, which is not repeated in this embodiment.

The method and device of presenting AV files, computer device, and readable storage medium provided in this embodiment divide the AV file into a first type of AV file and at least one second type of AV file. When the playing progress of the first type of AV file reaches the first preset position, it is detected whether a preset instruction is received. The other first type of AV file or the second type of AV file is played according to the preset instruction. Wherein, different types of AV files correspond to different plot designs, so that different types of AV files corresponding to different plots can be played according to preset instructions, which improves user experiences.

It should be noted that in this article, the terms "include", "comprise" or any other variant thereof are intended to cover non-exclusive inclusion, so that a process, method, article or device that includes a series of elements includes not only those elements, but also the other elements that are not explicitly listed, or include elements inherent to this process, method, article, or device. Without more restrictions, the element defined by the sentence "include one . . . " does not exclude that there are other identical elements in the process, method, article or device that includes the element.

The sequence numbers of the above embodiments of the present invention are used for description only, and do not represent the advantages and disadvantages of the embodiments.

From the above description of the implementation method, it is clear to those skilled in the art that the above implementation method can be implemented by means of software plus the necessary general hardware platform, or of course by means of hardware, but in many cases, the former is usually a better implementation method.

The embodiments described above are just preferred embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A method of implementing different plots of playing audio/video (AV) files, comprising:

generating and displaying a first interface, wherein the first interface comprises a list of a plurality of AV files and an editing area, wherein the plurality of AV files comprises at least one first type of AV file and at least one second type of AV file, wherein the at least one first type of AV file is a process video file corresponding to a developing process of at least two plots, wherein the at least one second type of AV file is an ending video file corresponding to an end of the at least two plots, and wherein the AV files comprise audio data and video data;

generating a plot graph based at least in part on an input by a first user via the first interface, wherein the plot graph comprises a directed cyclic graph and is configured to implement the at least two plots of playing the AV files, wherein the at least one first type of AV file and the at least one second type of AV file are associated with different nodes of the plot graph, wherein the at least one first type of AV file corresponds to a starting node of the plot graph, and wherein a first one of the at least one second type of AV file corresponds to a first ending node of the plot graph and a second one of the at least one second type of AV file corresponds to a second ending node of the plot graph;

playing a first type of AV file among the at least one first type of AV file;

determining whether a playing progress of the first type of AV file reaches a first predetermined position;

detecting whether a preset instruction is received in response to determining that the playing progress of the first type of AV file reaches the first predetermined position;

in response to detecting a receipt of the preset instruction, playing, based on the preset instruction, one of another first type of AV file among the at least one first type of AV file, the first one of the at least one second type of AV file, or the second one of the at least one second type of AV file, wherein the preset instruction is triggered by a user input via a second interface, and the method further comprises:

configuring the preset instruction;

establishing an association between the preset instruction and another first type of AV file or the second type of AV file;

determining whether the user input is received within a predetermined time; and triggering the preset instruction in response to determining that the user input is received within the predetermined time.

2. The method of claim 1, wherein the detecting that a preset instruction is received further comprises:

suspending playing the first type of AV file when the playing progress of the first type of AV file reaches the first predetermined position; and displaying a second interface.

3. The method of claim 1, wherein the preset instruction is a system instruction, and the method further comprises:

configuring the system instruction;

establishing an association between the system instruction and another first type of AV file or the second type of AV file;

determining whether a user input is received via a second interface within a predetermined time; and performing the system instruction in response to a determination that the user input is not received within the predetermined time.

4. The method of claim 1, further comprising:

configuring at least one variable;

assigning a value to the at least one variable in response to a determination that a user input is received via a second interface within a predetermined time; and in response to determining that the playing progress of the first type of AV file reaches a second predetermined position, playing a corresponding second type of AV file or a corresponding first type of AV file based at least in part on the value of the at least one variable.

5. The method of claim 1, wherein the plurality of AV files further comprise at least one third type of AV file, and the method further comprises when the playing progress of the first type of AV file reaches the first predetermined position, loading a third type of AV file among the at least one third type of AV file; or adjusting at least one of an amount of audio output or pixel values of video output frames of the first type of AV file.

6. The method of claim 1, further comprising:

configuring at least one display marker;

establishing an association between the at least one display marker and the first type of AV file;

displaying the at least one display marker while playing the first type of AV file; and wherein the at least one display marker comprises a first element and a second element, the first element corresponds to a first part of the first type of AV file that has been or is being played, and the second element corresponds to a second part of the first type of AV file that has not been played.

7. The method of claim 1, further comprising:

activating a timer; and performing the preset instruction when an output value of the timer reaches a threshold value.

8. The method of claim 2, wherein the second interface comprises a text control, a pattern control, a button control, a polygon input box, or a polygon trigger control, and the method further comprises:

receiving information from a user, the information indicating a content of the second interface and a position of displaying the second interface;

storing the information in the first type of AV file corresponding to a first node of the plot graph;

generating the second interface based on the information; and displaying the second interface based on the information when the playing progress of the first type of AV file reaches the first predetermined position.

9. A system of implementing different plots of playing audio/video (AV) files, comprising at least one processor; and at least one memory communicatively coupled to the at least one processor and storing instructions that upon execution by the at least one processor cause the system to:

generate and display a first interface, wherein the first interface comprises a list of a plurality of AV files and an editing area, and wherein the plurality of AV files comprises at least one first type of AV file and at least one second type of AV file, wherein the at least one first type of AV file is a process video file corresponding to a developing process of at least two plots, wherein the at least one second type of AV file is an ending video file corresponding to an end of the at least two plots, and wherein the AV files comprise audio data and video data;

generate a plot graph based at least in part on an input by a first user via the first interface, wherein the plot graph comprises a directed cyclic graph and is configured to implement the at least two plots of playing the AV files, wherein the at least one first type of AV file and the at least one second type of AV file are associated with different nodes of the plot graph, wherein the at least one first type of AV file corresponds to a starting node of the plot graph, and wherein a first one of the at least one second type of AV file corresponds to a first ending node of the plot graph and a second one of the at least one second type of AV file corresponds to a second ending node of the plot graph;

play a first type of AV file among the at least one first type of AV file;

determine whether a playing progress of the first type of AV file reaches a first predetermined position;

detect whether a preset instruction is received in response to determining that the playing progress of the first type of AV file reaches the first predetermined position;

in response to detecting a receipt of the preset instruction, play, based on the preset instruction, one of another first type of AV file among the at least one first type of AV file, the first one of the at least one second type of AV file, or the second one of the at least one second type of AV file, wherein the preset instruction is triggered by a user input via a second interface, and the instructions that upon execution by the at least one processor cause the system to:

configure the preset instruction;

establish an association between the preset instruction and another first type of AV file or the second type of AV file;

determine whether the user input is received within a predetermined time; and trigger the preset instruction in response to determining that the user input is received within the predetermined time.

10. The system of claim 9, the at least one memory further storing instructions that upon execution by the at least one processor cause the system to:
suspend playing the first type of AV file when the playing progress of the first type of AV file reaches the first predetermined position; and
display a second interface.

11. The system of claim 9, wherein the preset instruction is a system instruction, and the at least one memory further stores instructions that upon execution by the at least one processor cause the system to:
configure the system instruction;
establish an association between the system instruction and another first type of AV file or the second type of AV file;
determine whether a user input is received via a second interface within a predetermined time; and
perform the system instruction in response to a determination that the user input is not received within the predetermined time.

12. The system of claim 9, the at least one memory further storing instructions that upon execution by the at least one processor cause the system to:
configure at least one variable;
assign a value to the at least one variable in response to a determination that a user input is received via a second interface within a predetermined time; and
in response to determining that the playing progress of the first type of AV file reaches a second predetermined position, play a corresponding second type of AV file or a corresponding first type of AV file based at least in part on the value of the at least one variable.

13. The system of claim 10, wherein the second interface comprises a text control, a pattern control, a button control, a polygon input box, or a polygon trigger control, and wherein the at least one memory further stores instructions that upon execution by the at least one processor cause the system to:
receive information from a user, the information indicating a content of the second interface and a position of displaying the second interface;
store the information in the first type of AV file corresponding to a first node of the plot graph;
generate the second interface based on the information; and
display the second interface when the playing progress of the first type of AV file reaches the first predetermined position.

14. The system of claim 9, the at least one memory further storing instructions that upon execution by the at least one processor cause the system to:
configure at least one display marker;
establish an association between the at least one display marker and the first type of AV file;
display the at least one display marker while playing the first type of AV file; and
wherein the at least one display marker comprises a first element and a second element, the first element corresponds to a first part of the first type of AV file that has been or is being played, and the second element corresponds to a second part of the first type of AV file that has not been played.

15. A non-transitory computer-readable storage medium, which stores computer programs that upon execution by a processor cause the processor to perform operations, the operations comprising:
generating and displaying a first interface, wherein the first interface comprises a list of a plurality of AV files and an editing area, and wherein the plurality of AV files comprises at least one first type of AV file and at least one second type of AV file, wherein the at least one first type of AV file is a process video file corresponding to a developing process of at least two plots, wherein the at least one second type of AV file is an ending video file corresponding to an end of the at least two plots, and wherein the plurality of AV files comprise audio data and video data;
generating a plot graph based at least in part on an input by a first user via the first interface, wherein the plot graph comprises a directed cyclic graph and is configured to implement the at least two plots of playing the AV files, wherein the at least one first type of AV file and the at least one second type of AV file are associated with different nodes of the plot graph, wherein the at least one first type of AV file corresponds to a starting node of the plot graph, and wherein a first one of the at least one second type of AV file corresponds to a first ending node of the plot graph and a second one of the at least one second type of AV file corresponds to a second ending node of the plot graph;
playing a first type of AV file among the at least one first type of AV file;
determining whether a playing progress of the first type of AV file reaches a first predetermined position;
detecting whether a preset instruction is received in response to determining that the playing progress of the first type of AV file reaches the first predetermined position;
in response to detecting a receipt of the preset instruction, playing, based on the preset instruction, one of another first type of AV file among the at least one first type of AV file, the first one of the at least one second type of AV file, or the second one of the at least one second type of AV file, wherein the preset instruction is triggered by a user input via a second interface, and the causing the processor to further perform the operations comprising:
configuring the preset instruction;
establishing an association between the preset instruction and another first type of AV file or the second type of AV file;
determining whether the user input is received within a predetermined time; and
triggering the preset instruction in response to determining that the user input is received within the predetermined time.

* * * * *